Feb. 13, 1923.
W. A. BAKER
TELETHERMOMETER
Filed Mar. 15, 1917
1,444,771
2 sheets-sheet 1
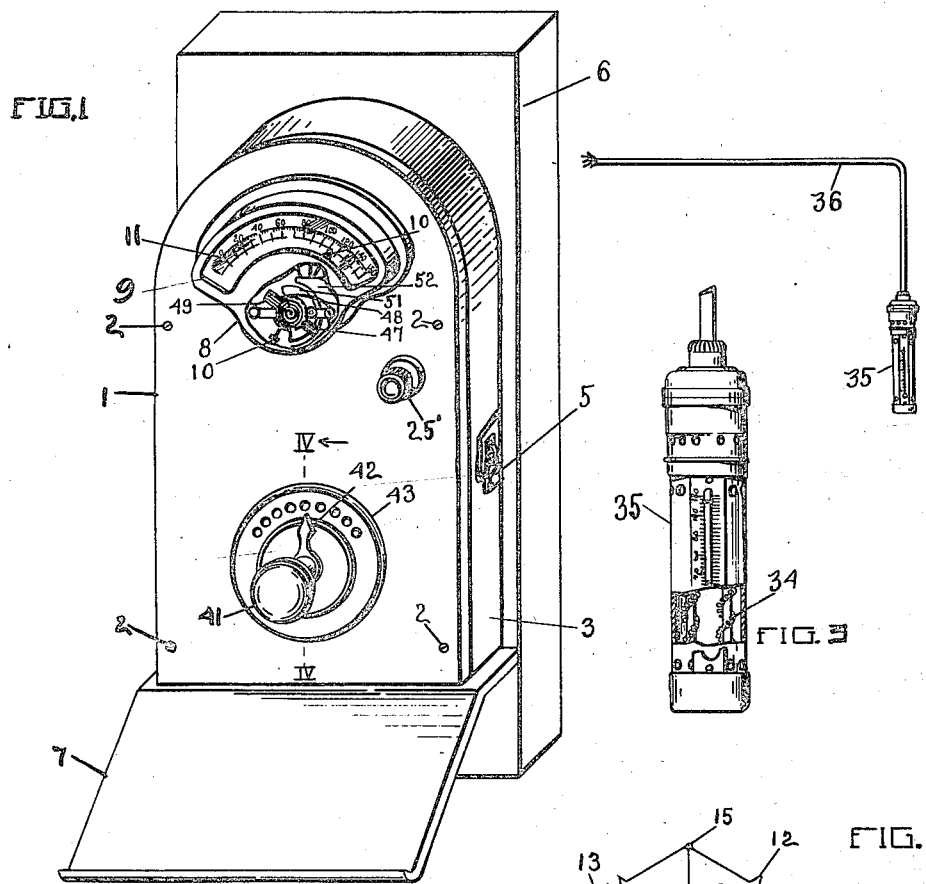
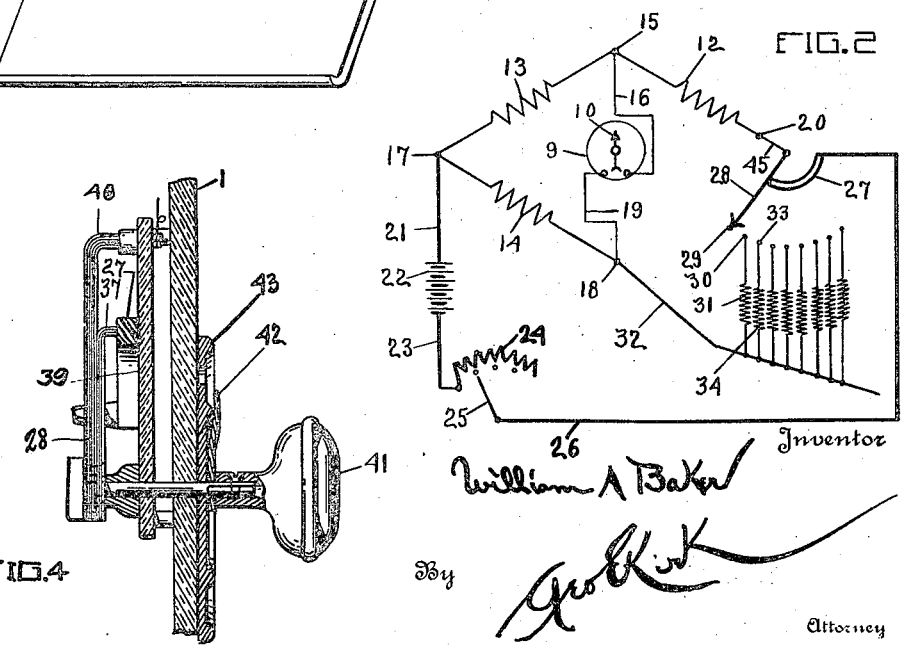
Inventor
William A Baker
By George Kirk
Attorney Feb. 13, 1923.
W. A. BAKER
TELETHERMOMETER
Filed Mar. 15, 1917.
1,444,771
2 sheets-sheet 2
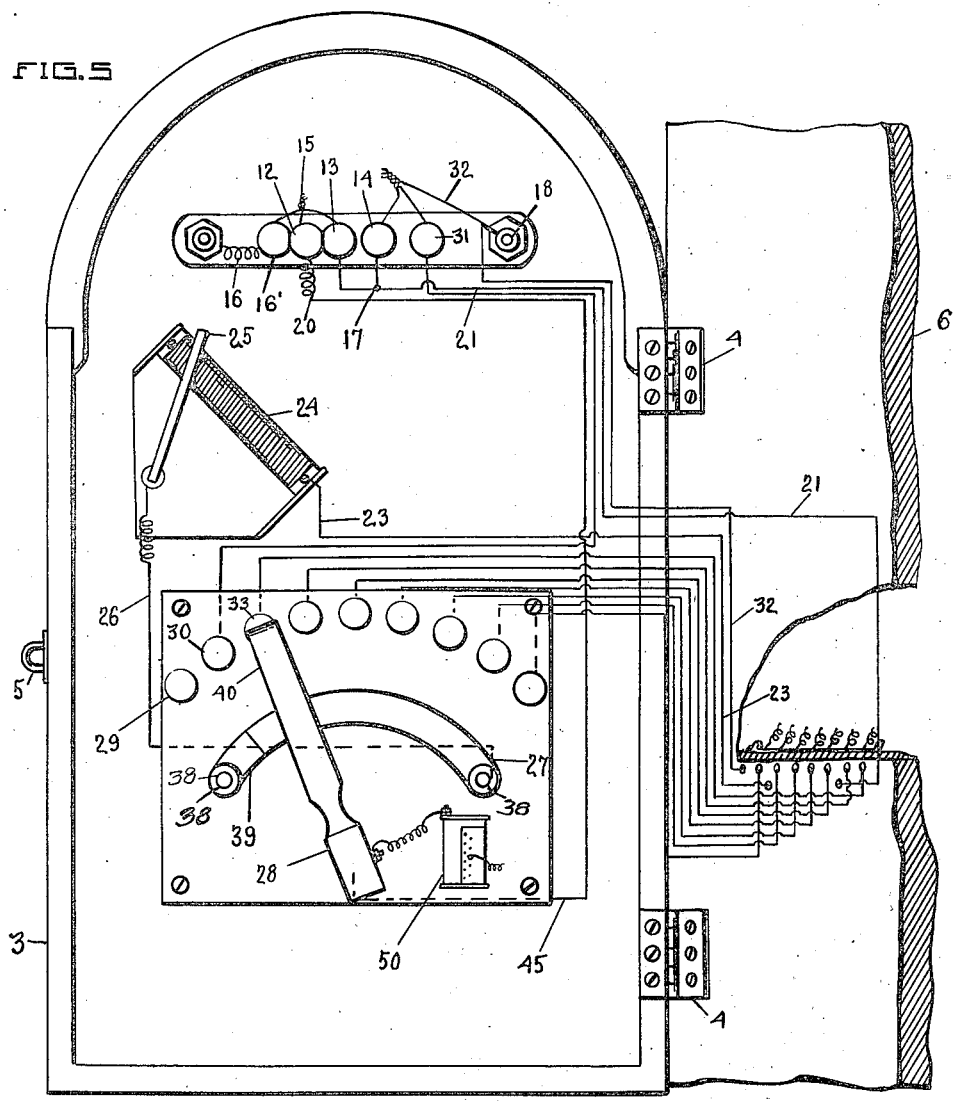
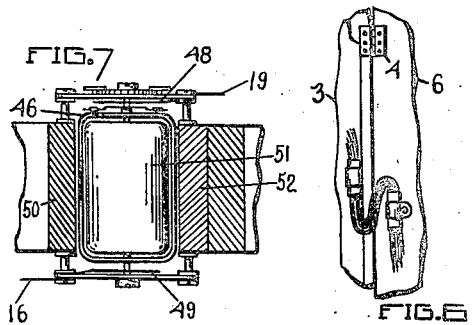
William A Baker, Inventor
By [signature], Attorney Patented Feb. 13, 1923.

1,444,771

UNITED STATES PATENT OFFICE.

WILLIAM A. BAKER, OF TOLEDO, OHIO, ASSIGNOR OF ONE-THIRD TO FREDERICK A. RAMLER, OF TOLEDO, OHIO.

TELETHERMOMETER.

Application filed March 15, 1917. Serial No. 155,133.

*To all whom it may concern:*

Be it known that I, WILLIAM A. BAKER, a citizen of the United States of America, residing at Toledo, Lucas county, Ohio, have invented new and useful Telethermometers, of which the following is a specification.

This invention relates to mechanism for disclosing a thermal condition at a remote point or points.

This invention has utility when incorporated in an indicating device for disclosing temperatures at a point or points more or less remote.

Referring to the drawings:

Fig. 1 is a perspective view of the central station and indicating instrument with portions broken away, showing one remote thermosensitive device in the mechanism incorporated as a telethermometer;

Fig. 2 is a wiring diagram of the device of Fig. 1;

Fig. 3 is an enlarged view of the room instrument with parts broken away;

Fig. 4 is a section on the line IV—IV, Fig. 1;

Fig. 5 is a view of the central station instrument opened, the lines being shown as a wiring diagram;

Fig. 6 is a detail of a flexing cable connection between the hinged and fixed panels; and Fig. 7 is a detail of the indicator needle mounting.

The panel unit 1 may be mounted by screws 2 upon the housing 3, which housing 3 may be mounted by hinges 4, (Fig. 5) and lock 5 on any portion of the building structure, as a side wall, auxiliary panel or frame 6. Below the panel 1 may be carried the desk 7 as a convenient holder for memoranda, say reports of temperature conditions in various places to which the central station is connected, and such time data incident thereto as may be desired.

Centrally of the upper portion of the panel 1 and on the front thereof is mounted the fan shaped instrument housing 8. In this housing is disposed the galvanometer 9, having the indicating means or needle 10 normally disposed at its inactive position, centrally of the scale 11 and away from the zero position. Adjacent this housing 8 are disposed in series the resistance arms 12, 13, 14, Fig. 2, of a Wheatstone bridge. Between the arms 12 and 13 is the terminal 15 from which extends the lead line 16 to one side of the galvanometer 9. Between the arms 13 and 14 is the terminal 17. On the opposite side of the resistance arm 14 is the terminal 18 which is connected by the line 19 to the other side of the galvanometer 9 from the line 16. In the apparatus a resistance coil 16' (Fig. 5) in line 16 may be used when the galvanometer is sensitive beyond the current range adopted for the other equipment.

The side of the resistance arm 12 remote from the terminal 15 has the terminal 20. From the terminal 17 extends the line 21 to an electrical energy source, as the battery 22. In series with the battery 22 and connected thereto by the line 23, is the resistance coil 24, having the arm 25 adjustable therealong. From this resistance extends the line 26 to the contact 27. The fourth resistance arm for the bridge having the resistances 12, 13, 14, may be selected between the terminals 18 and 20 by the multiple contact arm 28. As shown in Fig. 2, this arm 28 is at the off point 29. When moved to the point 30, the arm 28 closes a circuit from the contact 27 to the terminal 30 permitting current to flow from the arm 28 and terminal 30 through the resistance 31 (Fig. 2) in connection with the line 32 to the terminal 18. This resistance 31 is the test resistance and by manipulation of the knurled head 25' (Fig. 1) for the arm 25 may be adjusted to regulate the resistance in the main battery circuit, so that the needle 10 of the galvanometer will be brought to test position, say at a remote point on the scale 11, as at the right hand end of the scale in Fig. 1. This, accordingly, provides a large arc of movement for the indicating means 10 with the result that a reading of approximate accuracy at this test point will involve much greater refinements at less current consuming points of shorter arc movement in the travel of the indicating means 10. That is, with the reading for test taken at a position requiring a long arc travel or throw of the needle from its normal position of rest, the shorter arc travel or throw positions for normal readings are more accurate, as the error corrected on the longer arc throw is proportionally less for the shorter arc throws of the needle or indicator. Furthermore, the recovery of the needle from the normal reading positions is not to an impact or fixed abutment, but there is an easy short swing to rest central of the scale. Accordingly, with the points for most general use disposed adjacent the inactive position of the needle 10, the accuracy of the reading is many times greater than the accuracy at the test point, which test point adjustment may be made readily and with accuracy at each use of the instrument.

After moving the arm 28 to the point 30 for making the test, the arm may be moved to a point 33 connected to a desired remote instrument having resistance 34 thereby completing circuit through the arm and point 28 with the line 32 and terminal 18. This remote thermosensitive resistance 34 may be housed in a shell 35 and suspended by the line 36 as desired, say at a point in an auditorium, school-room, assembly room, hall, apartment, and in the plenum chamber, and out of doors, in order that the resistance of the coil may be varied by the change in its temperature. The indicating instrument, through the indicating means 10, will at once disclose the temperature as determined by current flow through the thermosensitive or working resistance 34. The number of these points 33 and thermosensitive resistance 34 may be as desired, to have the central station care for the heating plant, or other outfit.

The arm 28 comprises the contact 37 movable along the contact 27 as shown in Fig. 4. This contact 27 has travel limiting pins 38. The arm 28, when moved to position on the point 29, has the contact 37 against the insulation section 39. Besides the laminated contact 37, the arm 28 has the laminated contact 40 contacting with the pins 29, 30, 33. The arm 28 is manipulated by the handle 41. The contacts 37, 40, are maintained in firm relation to the points 29, 30, 33, and the contacts 27, through the medium of their own spring laminations. The handle 41 carries the indicator arm 42 movable over the dial 43 to indicate the source from which the reading is being taken. This arm 28 is connected by the line 45 with the terminal 20.

The grouping of the devices is such that all the wiring of the central station and its connections may be thoroughly assembled at the factory and brought to the job for installation, with only the outside connections to be made to the various remote places and to a battery, which battery may be even of a cheap dry-cell type.

There is, accordingly a device of great simplicity with little involved therewith to get out of order and all readily accessible. The current consumption is very low and the fluctuation in the battery may be readily cared for by the external adjustment knob 25'.

The needle 10 is mounted upon and connected to oscillate with the aluminum yoke or armature element 46 (Fig. 7). This yoke carries on its exterior many turns of fine copper wire 47 (Fig. 1). The spring 48, coiled in one direction connects the armature 46 to the line 19; while at the opposite extremity thereof, the oppositely coiled spring 49 connects the armature 46 to the line 16. Any movement of the aluminum core or yoke 46 tends to set up a counter-electromotive force in the armature circuit, as it cuts the magnetic lines of force in the magnetic circuit elements 50, 51, 52. This structure and action tend to make the needle dead beat in its operation, and the travel of the needle 10 is further dampened by the resistance 24 loading the main or battery circuit. Owing to the very slight travel to points of reading and small force to effect such action, the armature eddy currents also tend to bring the needle 10 quickly to rest.

In installing, to provide for uniform line resistance between the different instruments 34 and the central station, before connecting instrument 34, the free ends of the wires at the room may be united while at the central station terminals these lines are connected, one to a terminal for its instrument allotment, and the other is moved along the scale of the adjuster coil 50 (Fig. 5) in the fourth arm of the bridge until the instrument pointer 10 shows the test reading. This adjuster scale is stepped for known line lengths and accordingly, supplies definite data for phantom or additional line insertion to bring the several instruments 34 into equivalent relation to the central station.

What is claimed and it is desired to secure by Letters Patent is:

1. A telethermometer embodying a Wheatstone bridge having resistance arms provided with a pair of terminals, an electric energy source for the bridge having a terminal and a switch having an off position as to said energy source terminal, said switch shiftable for simultaneously connecting said three terminals and shiftable to open one arm of the bridge and to said off position to cut out the energy source.

2. A plurality of thermosensitive resistances having terminals, an indicating instrument having a terminal, an electric energy source having a terminal and a multiterminal engaging switch arm for simultaneously connecting the energy source, a resistance and the instrument through said terminals.

3. A thermosensitive resistance, a test resistance, an indicating instrument, an electric energy source, each provided with a terminal, and terminal engaging means including a switch for selecting a resistance and connecting therewith through said terminals the instrument and energy source whereby the indicating instrument may disclose a reading for such resistance as selected.

4. An indicating instrument provided with a scale, indicating means having its normal or idle position centrally of the scale, an energy source, a working resistance, a test resistance, and control means for placing the test resistance and energy source in circuit with the instrument for throwing the indicating means remote from its inactive position, said control means being also operable to cut out the test resistance and throw in the working resistance for a normal shifting of the indicating means to a less remote position than the test throw thereof.

5. A telethermometer provided with an indicating instrument having a single one direction scale calibrated consecutively for the full range thereof, indicating means for the scale having normal or idle position centrally of the scale, said scale having its normal readings adjacent the inactive position of the indicating means, an electric energy source provided with a terminal independent of said instrument, a thermosensitive resistance having a terminal, and a switch for connecting said terminals to place the energy source, said resistance and said instrument in circuit to operate the indicating means adjacent its inactive position.

6. A telethermometer central station panel unit embodying an indicating instrument having a terminal, circuit adjusting means having a terminal, an energy source having a terminal, and pivotally mounted terminal connecting means carried by said unit for connecting said instrument terminal and energy source terminal with said additional other terminal.

7. A telethermometer comprising an indicating instrument provided with an indicator, a scale for the indicator disposed to have its normal region for indication adjacent the inactive position of the indicator, a test point for the indicator remote from its inactive position proportionally magnifying test accuracy, a test resistance having a terminal, a working resistance connected to the instrument and having an additional terminal, an energy source connected to the instrument independently of said working resistance, and control means for the instrument for connecting said terminals to disclose a shifting of the indicator.

8. A telethermometer embodying a dead beat indicating instrument having a scale with the inactive position of indication central of said scale, an electric energy source having a terminal, a plurality of remote thermosensitive resistances having terminals, and terminal connecting means including a pivoted switch for selecting a remote resistance terminal and placing such in circuit with said instrument and energy source terminals.

9. A telethermometer embodying a dead beat indicating instrument having relatively movable scale and pointer means, a testing resistance, an energy source, a working resistance, and control means for connecting the instrument, energy source and testing resistance to disclose a reading near the end of said scale, said control means coacting in normal connection of the working resistance and energy source with the instrument to disclose a reading near the central position of said scale, whereby recovery therefrom avoids concussion and resulting deleterious effects to the instrument.

In witness whereof I affix my signature.

WILLIAM A. BAKER.